(12) United States Patent
Kondapalli

(10) Patent No.: US 7,873,048 B1
(45) Date of Patent: Jan. 18, 2011

(54) FLEXIBLE PORT RATE LIMITING

(75) Inventor: Raghu Kondapalli, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 828 days.

(21) Appl. No.: 11/411,616

(22) Filed: Apr. 26, 2006

Related U.S. Application Data

(60) Provisional application No. 60/741,602, filed on Dec. 2, 2005.

(51) Int. Cl.
*H04L 12/28* (2006.01)

(52) U.S. Cl. .................................... 370/392; 709/226

(58) Field of Classification Search .................. 370/229, 370/465, 392; 709/226, 235, 238, 231
See application file for complete search history.

(56) References Cited

U.S. PATENT DOCUMENTS

| | | | | |
|---|---|---|---|---|
| 6,389,468 | B1 * | 5/2002 | Muller et al. ............... | 709/226 |
| 6,578,082 | B1 | 6/2003 | Ho et al. | |
| 6,826,150 | B1 | 11/2004 | Bhattacharya et al. | |
| 2001/0012272 | A1 | 8/2001 | Aubert et al. | |
| 2002/0131365 | A1 * | 9/2002 | Barker et al. ............... | 370/235 |
| 2002/0152306 | A1 | 10/2002 | Tuck, III | |
| 2003/0123390 | A1 | 7/2003 | Takase et al. | |
| 2004/0049596 | A1 * | 3/2004 | Schuehler et al. ........... | 709/238 |
| 2004/0081169 | A1 | 4/2004 | Kloth et al. | |
| 2004/0105435 | A1 | 6/2004 | Morioka | |
| 2005/0019033 | A1 | 1/2005 | Oh et al. | |
| 2005/0141426 | A1 | 6/2005 | Hou | |
| 2006/0268696 | A1 * | 11/2006 | Konstantinov et al. ...... | 370/229 |

OTHER PUBLICATIONS

Leaky Bucket, from Wikipedia, Aug. 12, 2005; 3 pages.
Token Bucket, from Wikipedia, Aug. 10, 2005, 2 pages.
Address Resoultion Protocol (arp), Aug. 10, 2005; 3 pages.
BPDU, from Wikipedia, Aug. 10, 2005, 1 page.
DOCSIS, from Wikipedia, Aug. 12, 2005, 3 pages.
IEEE Std 801.1X-2004 (Revision of IEEE Std 802.1X-2001), IEEE Standard for Local and metropolitan area networks, Port-Based Network Access Control; IEEE Computer Society, Sponsored by the LAN/MAN Standards Committee, Dec. 13, 2004; 179 pages.

* cited by examiner

*Primary Examiner*—Man Phan
*Assistant Examiner*—Wei Zhao

(57) ABSTRACT

A switching device includes a parsing module, a classification module, a bandwidth tracking module, and a rate limitation module. The parsing module receives packets and separates layer four packets from the packets. The classification module classifies the layer four packets into control packets and data packets. The bandwidth tracking module communicates with the classification module and has a fullness level. The rate limitation module selectively performs an action on at least one of the control packets and data packets based on the fullness level. The action includes at least one of discarding, asserting flow control, and accepting the at least one of the control packets and data packets.

52 Claims, 11 Drawing Sheets

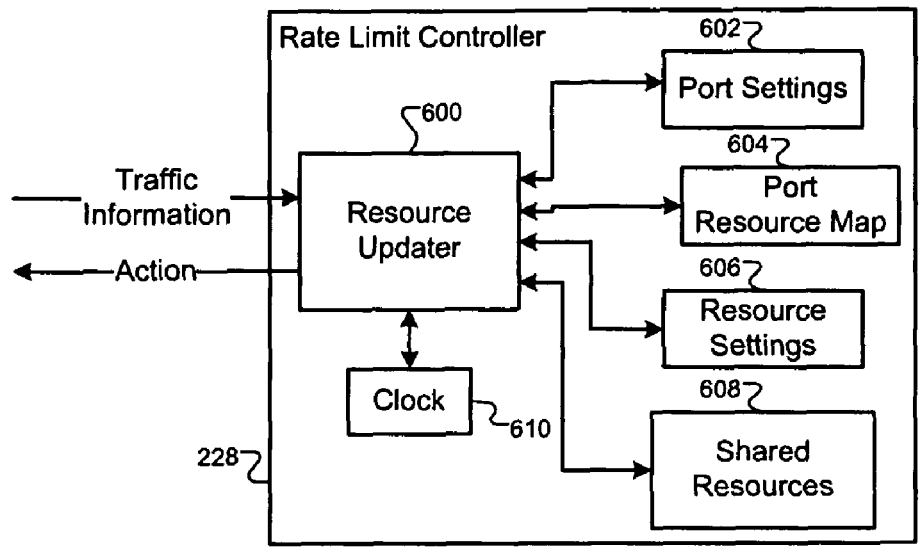

FIG. 10

| Parameter | Description | # Bits |
|---|---|---|
| VID_NRL | VLAN ID Non Rate Limit- When set, rate limiting is disabled for packets whose VID entry in the VLAN database contains a set Non Rate Limit bit | 1 |
| SA_NRL | Source Address Non Rate Limit- When set, rate limiting is disabled for packets whose SA entry in the switch table contains a set Non Rate Limit bit | 1 |
| DA_NRL | VLAN ID Non Rate Limit- When set, rate limiting is disabled for packets whose VID entry in the VLAN database contains a set Non Rate Limit bit | 1 |
| FC_Mode | Flow Control Mode- determines when flow control is deasserted<br>= 0 deassert when bucket becomes empty<br>= 1 deassert when bucket is less than EBS – CBS | 1 |
| Rate_Resource | N-bit bit field, where N is the number of buckets. The kth bucket is assigned to this port when the kth Rate_Resource bit is set. | 12 |

FIG. 11

| Parameter | Description | # Bits |
|---|---|---|
| CBS_Limit | Committed Burst Size limit- This indicates the committed burst amount. | 24 |
| EBS_Limit | Excess Burst Size limit- This effectively indicates the size of the bucket. | 24 |
| EBS_Limit_Action | If the incoming port information rate exceeds the EBS_Limit, this field specifies the action that needs to be taken for the violating traffic.<br>= 0 discard the packet<br>= 1 assert flow control | 1 |
| Account_Q_Congest | = 0 ignore packets discarded because of queue congestion<br>= 1 count packets discarded because of queue congestion | 1 |
| Account_Filtered | = 0 ignore packets filtered in switch<br>= 1 count packets filtered in switch | 1 |
| Bucket_Rate_Factor | This indicates the number of tokens to remove from the bucket per time interval (porportional to the Committed Information Rate). | 16 |
| Bucket_Rate_Type | = 0 bucket is packet type based<br>= 1 bucket is rate based | 1 |
| Bucket_Type_Mask | This bitfield is used when Bucket_Rate_Type = 0.<br>Count bytes from packet types:<br>[0] - Multicast<br>[1] - ARP<br>[2] - Pause<br>[3] - BPDU<br>[4] – TCP CTRL<br>[5] – TCP DATA<br>[6] - UDP<br>[7] – NonTCPUDP | 11 |
| Bits_To_Count | This bitfield is used when Bucket_Rate_Type = 1.<br>Count all bits except for:<br>[0] – Frame Mode<br>[1] - Layer 1 bits<br>[2] - Layer 2 bits<br>[3] - Layer 3 bits | 3 |
| Bucket_Increment | This indicates the number of tokens that need to be added per each bucket increment. | 12 |
| Bucket_Token_Count | This indicates the current number of tokens available in the current bucket. The initial value is expected to be programmed by software as part of the chip initialization. | 24 |
| Last_Updated_Time | This indicates the last time the bucket was updated with tokens. | 8 |
| Bytes_Dropped | This indicates the number of bytes of dropped packets corresponding to the bucket. This counter does not have a maximum value and so it wraps around. | 16 |
| Bytes_Received | This indicates the number of bytes of packets corresponding to the bucket. This counter does not have a maximum value and so it wraps around. | 16 |

FIG. 12

FLEXIBLE PORT RATE LIMITING

CROSS-REFERENCE TO RELATED APPLICATIONS

This application claims the benefit of U.S. Provisional Application No. 60/741,602, filed on Dec. 2, 2005, which is incorporated herein by reference in its entirety.

FIELD OF THE INVENTION

The present invention relates to rate-limiting in a network device.

BACKGROUND OF THE INVENTION

Referring now to FIG. 1, a functional block diagram of an exemplary broadband system according to the prior art is depicted. A service provider 100 communicates with the Internet 102. The service provider communicates with first and second modems 104-1 and 104-2. End users connect routers 106-1 and 106-2 to the modems 104-1 and 104-2, respectively. Users then connect computers 108-1 and 108-2 to the routers 106-1 and 106-2, respectively. The users have Service Level Agreements (SLAs) with the service provider 100 that define their terms of service, including bandwidth limits. The service provider 100 programs each of the modems 104 with allowed bandwidth rates using a mechanism such as DOCSIS (Data Over Cable Service Interface Specification). In this way, each traffic flow arriving at the service provider 100 is rate-shaped by the respective modem 104.

In a direct broadband system, such as is widely deployed in South Korea, computers and/or routers connect directly to an Internet Service Provider (ISP) 150, as depicted in FIG. 2. The ISP maintains a connection to the Internet 152, and communicates with routers 154-1 and 154-2. Computer 156-1 is connected to router 154-1, and computers 156-2 and 156-3 are connected to router 154-2. Computer 156-4 communicates directly to the ISP 150. In this example, none of the traffic arriving at the ISP 150 is rate-shaped, and therefore may arrive at full line speed (e.g., 100 Mbps). Users transmitting at full line speed may use so much bandwidth that the quality of service for other users is diminished. The ISP 150 would like to be able to apportion available bandwidth among the users, possibly offering higher levels of service (such as greater bandwidth) for increased fees.

Referring now to FIG. 3, a functional block diagram of an exemplary Internet Service Provider (ISP) network is depicted. The ISP 200 may service a number of users 202-1, 202-2, 202-3, . . . , and 202-m. The users 202 communicate with edge routers 204-1, 204-2, . . . , and 204-n. The edge routers 204 typically communicate with core routers 206-1, 206-2, 206-3, and 206-p . . . . Core routers 206 interconnect with each other and possibly communicate with the Internet 208, as core routers 206-2 and 206-3 do in this example.

SUMMARY OF THE INVENTION

A switching device includes a parsing module, a classification module, a bandwidth tracking module, and a rate limitation module. The parsing module receives packets and separates layer four packets from the packets. The classification module classifies the layer four packets into control packets and data packets. The bandwidth tracking module communicates with the classification module and has a fullness level. The rate limitation module selectively performs an action on at least one of the control packets and data packets based on the fullness level. The action includes at least one of discarding, asserting flow control, and accepting the at least one of the control packets and data packets.

In other features, the control packets are transmission control protocol (TCP) control packets.

In other features, the data packets are transmission control protocol (TCP) data packets.

In other features, the data packets are user datagram protocol (UDP) data packets.

In other features, the data packets are non-TCP/UDP data packets.

In other features, the parsing module separates layer two packets from the packets. The classification module inspects a header in the layer two packets to classify the control packets and data packets. The classification module inspects a header in the layer four packets to classify the control packets and data packets.

In other features, the rate limitation module decreases the fullness level at a predetermined rate and selectively increases the fullness level.

In still other features, at least one of the control packets and data packets are selectively exempted from the action. At least one of the control packets and data packets are selectively exempted from the action based upon a property of the packets, wherein the property includes at least one of VLAN ID, source address, and destination address.

A switching device includes a parsing module, a classification module, a bandwidth tracking module, and a rate limitation module. The parsing module receives packets and separates the packets into parsed packets. The classification module classifies the parsed packets into transmission control protocol (TCP) control packets and data packets. The bandwidth tracking module communicates with the classification module and has a fullness level. The rate limitation module selectively performs an action on at least one of the TCP control packets and data packets based on the fullness level. The action includes at least one of discarding, asserting flow control, and accepting the at least one of the TCP control packets and data packets.

In other features, the data packets are TCP data packets.

In other features, the data packets are user datagram protocol (UDP) data packets.

In other features, the data packets are non-TCP/UDP data packets.

In other features, the classification module inspects a header of the parsed packets to classify the TCP control packets and data packets.

In other features, the header is a layer four header.

In other features, the header is a layer two header.

In other features, the rate limitation module decreases the fullness level at a predetermined rate and selectively increases the fullness level.

In still other features, at least one of the TCP control packets and data packets are selectively exempted from the action. At least one of the TCP control packets and data packets are selectively exempted from the action based on a property of the packets, wherein the property includes at least one of VLAN ID, source address, and destination address.

A rate limiting method for a switching device includes receiving packets. The method includes separating layer four packets from the packets. The method includes classifying the layer four packets into control packets and data packets. The method includes selectively performing an action on at least one of the control packets and data packets based on a fullness level. The action includes at least one of discarding, asserting flow control, and accepting the at least one of the control packets and data packets.

In other features, the control packets are transmission control protocol (TCP) packets.

In other features, the data packets are transmission control protocol (TCP) data packets.

In other features, the data packets are user datagram protocol (UDP) packets.

In other features, the data packets are non-TCP/UDP data packets.

In other features, the method includes separating layer two packets from the data packets. The method includes inspecting a header in the layer two packets to classify the control packets and data packets. The method includes inspecting a header in the layer four packets to classify the control packets and the data packets. The method includes decreasing the fullness level at a predetermined rate and selectively increasing the fullness level.

In still other features, at least one of the control packets and data packets are selectivity exempted from the action. At least one of the control packets and data packets from the action based upon a property of the packets, wherein the property includes at least one of VLAN ID, source address, and destination address.

A rate limiting method for a switching device includes receiving packets. The method includes separating the packets into parsed packets. The method includes classifying the parse packets into transmission control protocol (TCP) control packets and data packets. The method includes selectively performing an action on at least one of the TCP control packets and data packets based on a fullness level. The action includes at least one of discarding, asserting flow control, and accepting the at least one of the TCP control packets and data packets.

In other features, the data packets are TCP data packets.

In other features, the data packets are user datagram protocol (UDP) packets.

In other features, the data packets are non-TCP/UDP data packets.

In other features, the method includes inspecting a header of the parsed packets to classify the TCP control packets and the data packets.

In other features, the header is a layer four header.

In other features, the header is a layer two header.

In other features, the method includes decreasing the fullness level at a predetermined rate and selectively increasing the fullness level. The method includes selectively exempting the at least one of the TCP control packets and data packets from the action.

In still other features, the method includes exempting the at least one of the TCP control packets and data packets bases on a property of the packets, wherein the property includes at least one of VLAN ID, source address, and destination address.

A switching device includes parsing means for receiving packets and for separating layer four packets from the packets, classification means for classifying the layer four packets into control packets and data packets, bandwidth tracking means for communicating with the classification means, and rate limitation means for selectively performing an action on at least one of the control packets and data packets based on a fullness level, wherein the action includes at least one of discarding, asserting flow control, and accepting the at least one of the control packets and data packets.

In other features, the control packets are transmission control protocol (TCP) control packets.

In other features, the data packets are transmission control protocol (TCP) data packets.

In other features, the data packets are user datagram protocol (UDP) data packets.

In other features, the data packets are non-TCP/UDP data packets.

In other features, the parsing means separates layer two packets from the packets. The classification means inspects a header in the layer four packets to classify the control packets and data packets. The classification means inspects a header in the layer two packets to classify the control packets and data packets. The rate limitation means decreases the fullness level at a predetermined rate and selectively increases the fullness level.

In still other features, at least one of the control packets and data packets are selectively exempted from the action. At least one of the control packets and data packets are selectively exempted from the action based on a property of the packets, wherein the property includes at least one of VLAN ID, source address, and destination address.

A switching device includes parsing means for receiving packets and for separating the packets into parsed packets, classification means for classifying the parsed packets into transmission control protocol (TCP) control packets and data packets, bandwidth tracking means for communicating with the classification means, and rate limitation means for selectively performing an action on at least one of the TCP control packets and data packets based on a fullness level, wherein the action includes at least one of discarding, asserting flow control, and accepting the at least one of the TCP control packets and data packets.

In other features, the data packets are TCP data packets.

In other features, the data packets are user datagram protocol (UDP) data packets.

In other features, the data packets are non-UDP/TCP data packets.

In other features, the classification means inspects a header of the parsed packets to classify the TCP control packets and data packets.

In other features, the header is a layer four header.

In other features, the header is a layer two header.

In other features, the rate limitation means decreases the fullness level at a predetermined rate and selectively increases the fullness level.

In still other features, at least one of the TCP control packets and data packets are selectively exempted from the action. At least one of the TCP control packets and data packets are selectively exempted from the action based on a property of the packets, wherein the property includes at least one of VLAN ID, sources address, and destination address.

A computer program executed by a processor for controlling a switching device includes receiving packets. The computer program includes separating layer four packets from the packets. The computer program includes classifying the layer four packets into control packets and data packets. The computer program includes selectively performing an action on at least one of the control packets and data packets based on a fullness level. The action includes at least one of discarding, asserting flow control, and accepting the at least one of the control packets and data packets.

In other features, the control packets are transmission control protocol (TCP) packets.

In other features, the data packets are transmission control protocol (TCP) data packets.

In other features, the data packets are user datagram protocol (UDP) packets.

In other features, the data packets are non-TCP/UDP data packets.

In other features, the computer program includes separating layer two packets from the data packets. The computer program includes inspecting a header in the layer four packets to classify the control packets and the data packets. The computer program includes inspecting a header in the layer two packets to classify the control packets and data packets. The computer program includes decreasing the fullness level at a predetermined rate and selectively increasing the fullness level. The computer program includes selectively exempting at least one of the control packets and data packets from the action.

In still other features, the computer program includes selectively exempting at least one of the control packets and data packets from the action based upon a property of the packets. The property includes at least one of VLAN ID, source address, and destination address.

A computer program stored executed by a processor for controlling a switching device includes receiving packets. The computer program includes separating the packets into parsed packets. The computer program includes classifying the parse packets into transmission control protocol (TCP) control packets and data packets. The computer program includes selectively performing an action on at least one of the TCP control packets and data packets based on a fullness level. The action includes at least one of discarding, asserting flow control, and accepting the at least one of the TCP control packets and data packets.

In other features, the data packets are TCP data packets.

In other features, the data packets are user datagram protocol (UDP) packets.

In other features, the data packets are non-TCP/UDP data packets.

In other features, the computer program includes inspecting a header of the parsed packets to classify the TCP control packets and the data packets.

In other features, the header is a layer four header.

In other features, the header is a layer two header.

In other features, the computer program includes decreasing the fullness level at a predetermined rate and selectively increasing the fullness level. The computer program includes selectively exempting the at least one of the TCP control packets and data packets from the action.

In still other features, the computer program includes selectively exempting the at least one of the TCP control packets and data packets bases on a property of the packets. The property includes at least one of VLAN ID, source address, and destination address.

In still other features, the methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 is a functional block diagram of an exemplary implementation of a rate limit controller;

FIG. 11 is a table of exemplary port settings;

FIG. 12 is a table of exemplary resource settings;

DETAILED DESCRIPTION OF THE PREFERRED EMBODIMENTS

Figure 1:
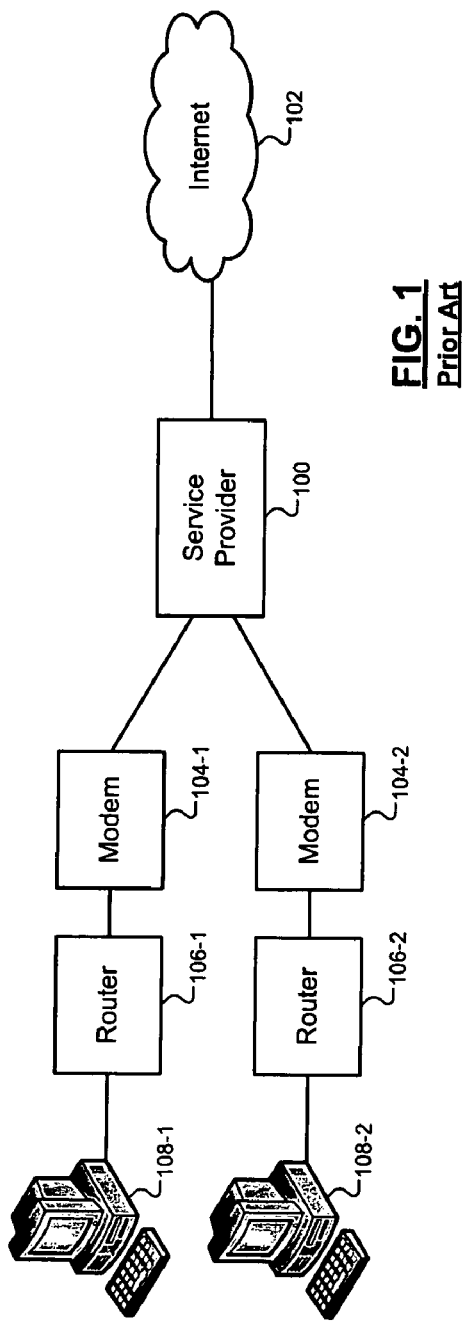
FIG. 1 is a functional block diagram of an exemplary modem broadband system according to the prior art.
Figure 2:
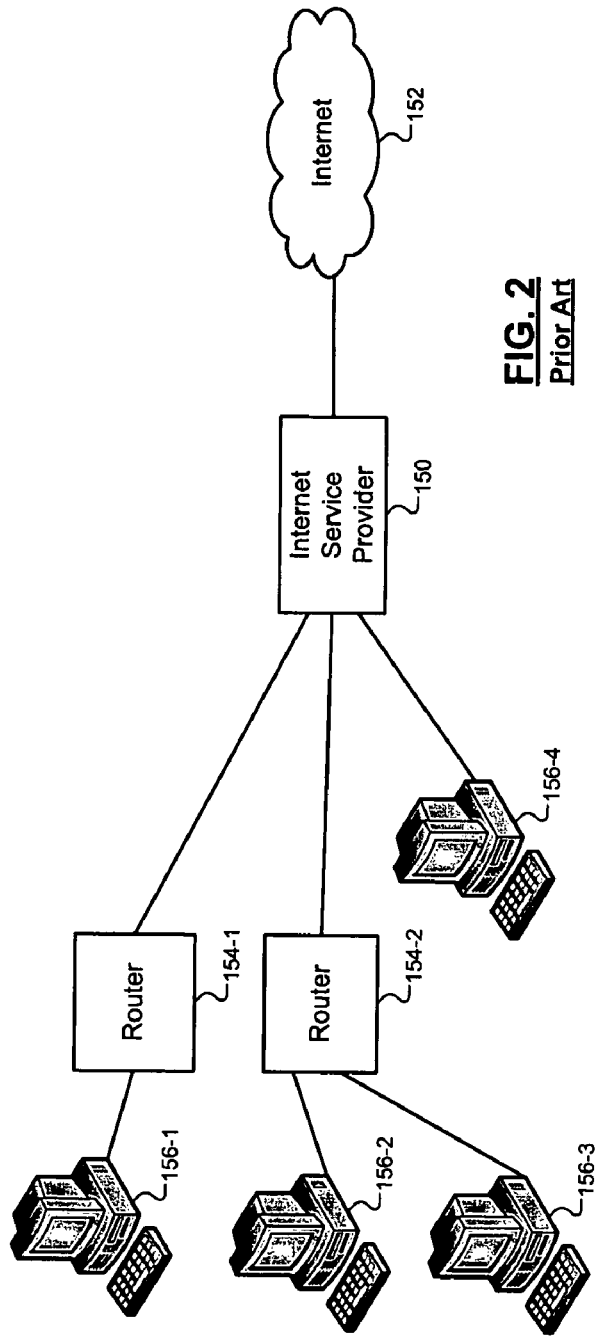
FIG. 2 is a functional block diagram of direct connection to an Internet Service Provider (ISP) according to the prior art.
Figure 3:
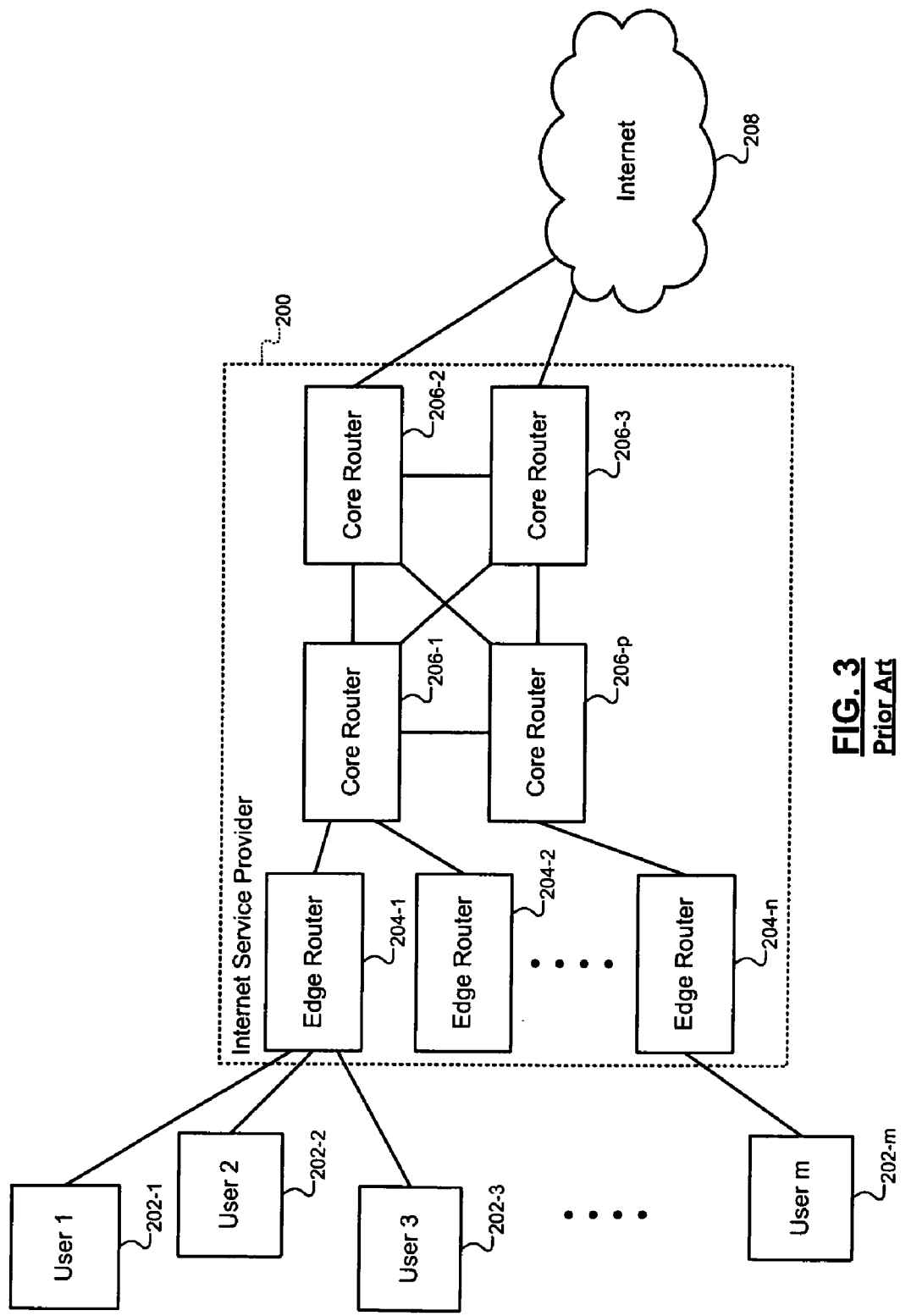
FIG. 3 is a functional block diagram of an exemplary ISP network according to the prior art.

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

Figure 4:
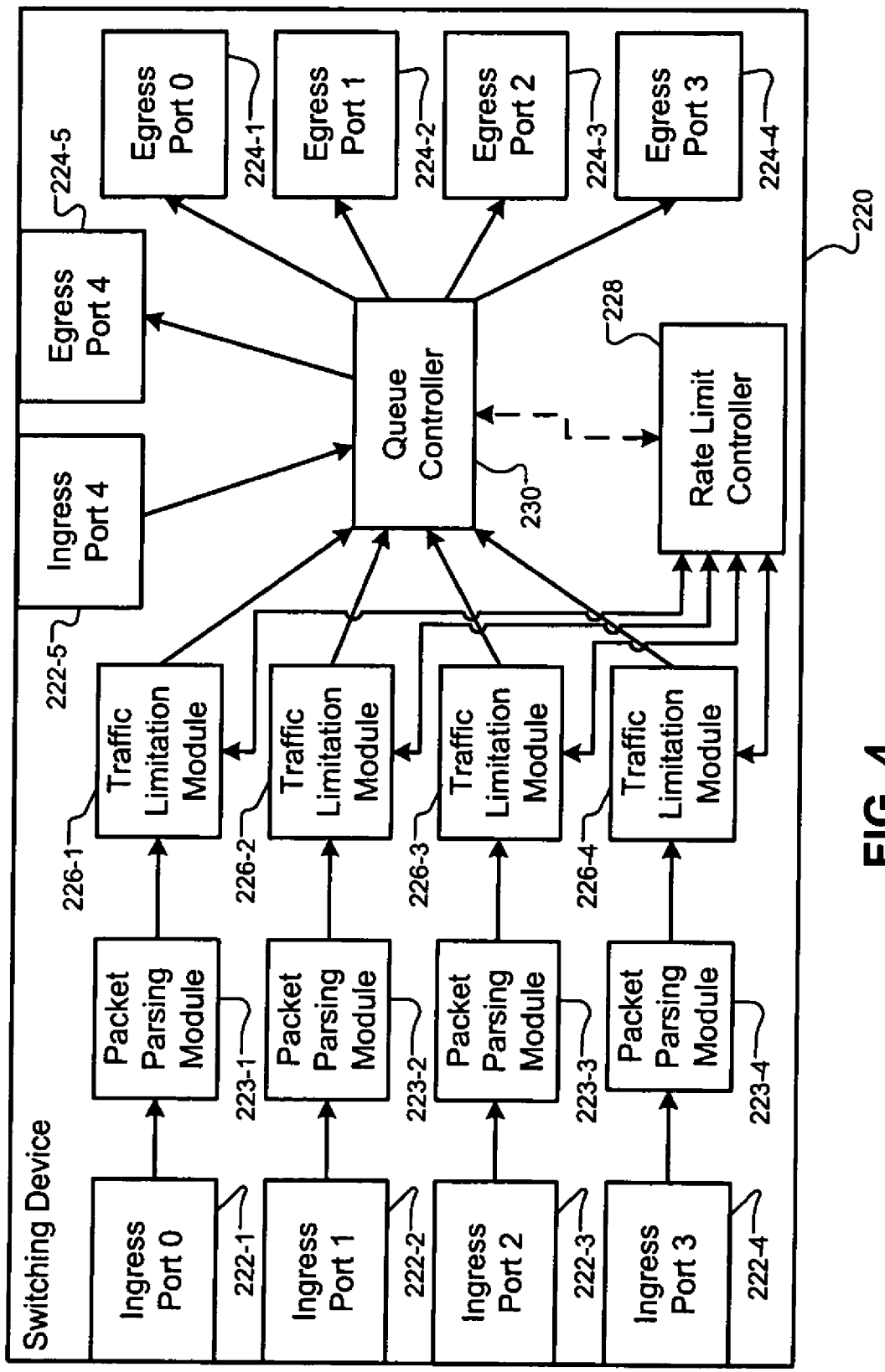
FIG. 4 is a functional block diagram of an exemplary switching device.

Referring now to FIG. 4, a functional block diagram of an exemplary switching device is depicted. The switching device 220 may operate at layer 2 or layer 3 of the Open Systems Interconnection Reference Model (OSI Model) as defined by the International Organization for Standardization in ISO standard 7498-1, which is incorporated by reference in its entirety. The switching device 220 may be, for example, a layer 2 switch, a layer 3 switch, a router, a bridge, and/or a core router, but in this discussion will be treated as an edge router. The switching device 220 has provisions for five ports in this example, with four ports reserved for users, and the fifth port used as a trunk port. The switching device 220 may have greater or fewer number of ports, and may have no dedicated trunk ports or more than one trunk port. The five ports have ingress modules 222-1, 222-2, 222-3, 222-4, and 222-5, respectively, and egress modules 224-1, 224-2, 224-3, 224-4, and 224-5, respectively.

The ingress modules 222-1, 222-2, 222-3, and 222-4 communicate with packet parsing modules 223-1, 223-2, 223-3, and 223-4, respectively. The packet parsing modules 223 receive data from the ingress modules 222 and parse the data into different layers according to the OSI model. Traffic limitation modules 226-1, 226-2, 226-3, and 226-4 receive the parsed data and limit traffic flow based on the parsed data. In some implementations, the trunk port ingress module 222-5 may communicate with a packet parsing module, which communicates with a traffic limitation module. The traffic limitation modules 226 communicate with a rate limit controller 228. The rate limit controller 228 receives information about incoming packets and generates signals instructing the traffic limitation modules 226 as to what action to take with the incoming packets. A queue controller 230 communicates with the traffic limitation modules 226, the fifth port ingress module 222-5, and the egress modules 224. The queue controller 230 directs packets from one port to another based upon routing information included in the packet. The queue controller 230 may buffer packets if a particular egress port is congested, and may drop packets that can not be accommodated. Information regarding these dropped packets may be communicated to the rate limit controller 228 for use in making rate-limiting decisions.

The ingress modules 222 receive incoming packets and may verify that the switching device 220 is a proper target of incoming packets. The ingress modules 22 may also verify that the incoming packets have a valid checksum (or some other transmission validation, such as a Cyclic Redundancy Check). The ingress modules 222 may discard (or filter) packets that do not meet these or other conditions. Information regarding these dropped packets may be communicated to the rate limit controller 228, possibly via the corresponding traffic limitation module 226, for use in making rate-limiting decisions. The traffic limitation modules 226 may discard packets, tag packets, pass packets, and/or instruct the corresponding ingress module 222 to assert flow control.

Figure 5:
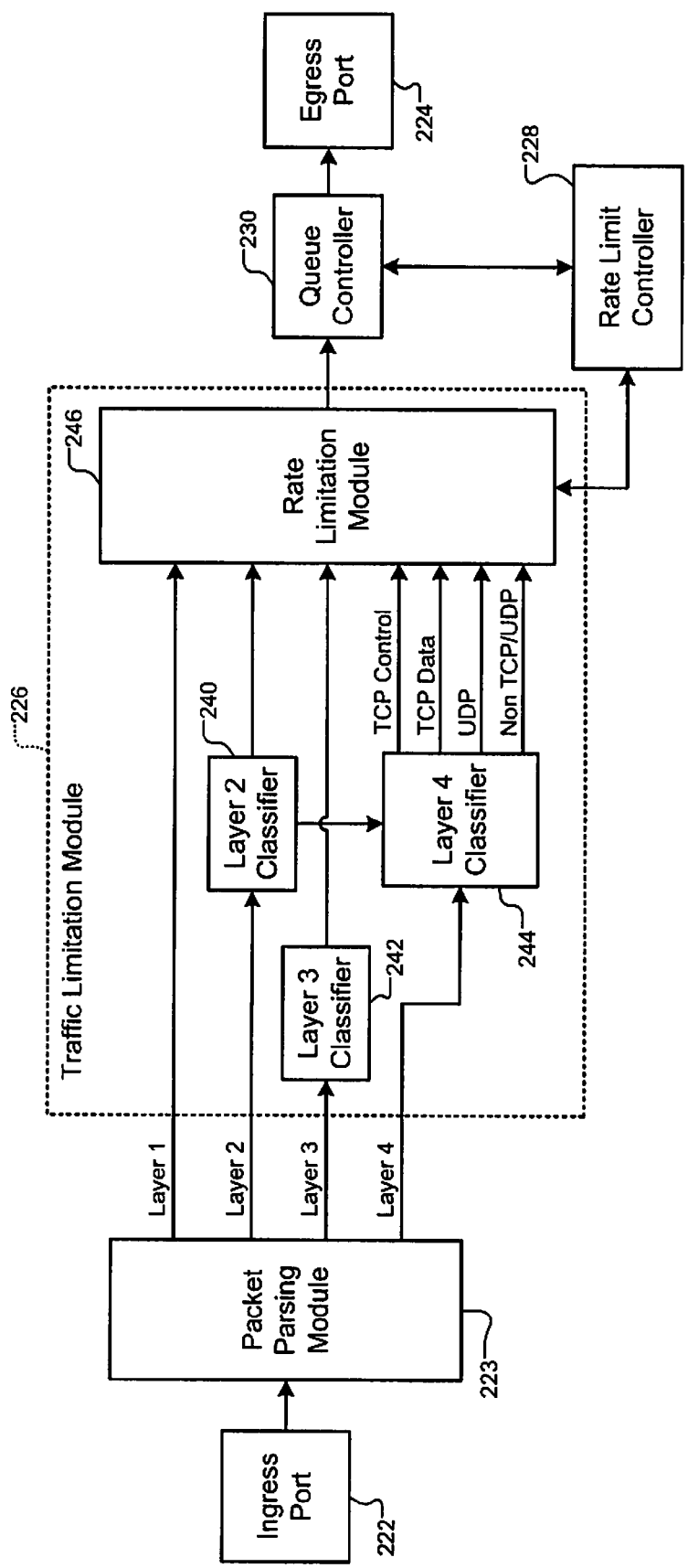
FIG. 5 is a functional block diagram of an exemplary traffic limitation module.

Referring now to FIG. 5, each traffic limitation module 226 may include a layer 2 classifier 240, a layer 3 classifier 242, a layer 4 classifier 244, and a rate limitation module 246. The layer 2 classifier 240 receives layer 2 data from the packet parsing module 223. The layer 2 classifier 240 classifies the layer 2 data into different layer 2 data types. Exemplary layer 2 data types may include, but are not limited to, multicast, unicast, IPv4 (Internet Protocol Version 4), and IPv6 (Internet Protocol Version 6) data. The layer 3 classifier 242 receives layer 3 data from the packet parsing module 223 and classifies the layer 3 data into different layer 3 data types. Exemplary layer 3 data types may include, but are not limited to, address resolution protocol (ARP), multicast, and unicast data. The layer 4 classifier 244 receives layer 4 data from the packet parsing module 223 and classifies the layer 4 data into different layer 4 data types. The layer 4 classifier 244 may generally classify data into control data and information data. More specifically, the layer 4 classifier 244 may classify the layer 4 data into TCP (Transmission Control Protocol) control packets, TCP data packets, UDP (User Datagram Protocol) data packets, and Non-TCP/UDP data packets.

TCP control packets refer to all control related traffic for layer 4 TCP. For example, TCP control packets may include SYN (synchronization), FIN (finish), ACK (acknowledgment), and various other flags used to establish, control, and terminate a connection. TCP data packets refer to data, other than control, that is being exchanged. Exemplary TCP data packets include, but are not limited to, FTP (file transfer protocol), Telnet, peer-to-peer applications (such as Kazaa), and streaming applications (such as IPTV).

TCP control packets may be given priority to ensure that they are received. Ensuring that TCP control packets are received helps minimize traffic transmission. For example, if a packet that has an ACK flag set is dropped, the TCP data packets, which are larger than the TCP control packets, are retransmitted and may congest the switch 220. In addition, by controlling TCP control traffic, congestion caused by certain denial of service attacks may be controlled.

The layer 4 classifier 244 may communicate with the layer 2 classifier 242. The layer 2 classifier 242 may be configured to classify layer 2 data to aid the layer 4 classifier in classifying the layer 4 data. More specifically, the layer 2 classifier 242 may classify the layer 2 data into one of IPv4 data and IPv6 data. In addition, the layer 2 classifier 242 may classify data as a tagged or untagged data type in order to determine whether the data is associated with a virtual local area network (VLAN). The layer 4 classifier 244 may use the aforementioned layer 2 classifications to determine which bytes to inspect in a layer 4 header when classifying the layer 4 data.

The rate limitation module 246 receives the classified data from the classifiers 240, 242, and 244. The rate limitation module 246 may also receive data directly from the packet parsing module 223 when the data does not need to be classified. For example, the rate limitation module 246 may receive layer 1 data directly from the packet parsing module 223. The rate limitation module 246 may limit the layer 1 data to effectively limit an overall data rate of the ingress port 222. The rate limitation module 246 may be configured to limit a rate of each type of data received. The rate limit controller 228 communicates with rate limitation module 246. The rate limit controller 228 receives information about incoming packets and generates signals instructing the rate limitation module 246 as to what action to take with the incoming packets.

Figure 6:
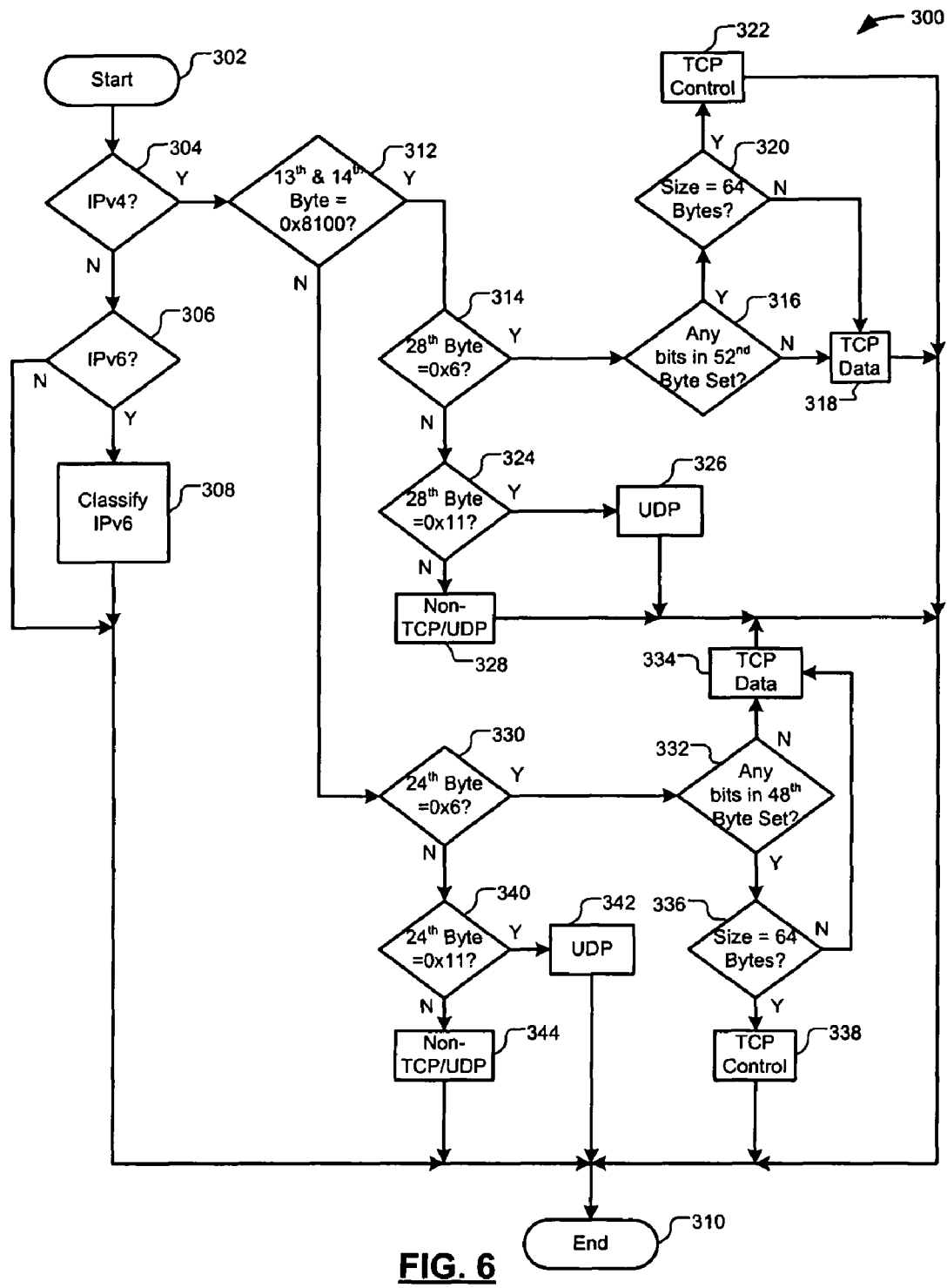
FIG. 6 is a flowchart depicting exemplary steps performed by a rate limitation module for a network that uses Internet Protocol Version 4.

Referring now to FIG. 6, the layer 4 data may be classified using steps generally identified at 300. The process begins in step 302 when the layer 4 classifier 244 receives layer 4 data from the packet parsing module 223. In step 304, the layer 2 classifier 240 determines whether the layer 2 data is IPv4. If the data is not IPv4, the layer 2 classifier 240 determines whether the layer 2 data is IPv6 in step 306. The layer 2 classifier 240 may determine whether the layer 2 data is IPv4 or IPv6 by inspecting a protocol identifier in a layer 2 header. If the layer 2 data is IPv6, the layer 2 data is classified using an IPv6 classification method in step 308 and the process ends in step 310. If the layer 2 data is not determined to be IPv6, the process ends in step 310.

In step 312, the layer 2 classifier 240 may determine whether the layer 2 data is tagged (meaning that it is associated with a VLAN) or untagged. The layer 2 classifier 240 may determine whether the layer 2 data is tagged by inspecting a $13^{th}$ and $14^{th}$ byte of the layer 2 header. If the $13^{th}$ and $14^{th}$ bytes are both set to 0x8100, the layer 2 data is tagged, otherwise the layer 2 data is untagged. If the layer 2 data is tagged, the layer 4 classifier 244 determines whether a $28^{th}$ byte in the layer 4 header is set to 0x6 in step 314. If the $28^{th}$ byte is set to 0x6, the layer 4 data is likely TCP. If the $28^{th}$ byte is set to 0x6, the layer 4 classifier 244 determines whether any bits in a $52^{nd}$ byte in the layer 4 header are set in step 316. To determine whether any bits in the $52^{nd}$ byte are set, the layer 4 classifier 244 may use a logical OR operation on all the bits in the $52^{nd}$ byte. If none of the bits in the $52^{nd}$ byte are set, the layer 4 classifier 244 determines that the data is TCP data in step 318 and the process ends in step 310.

If at least one bit in the $52^{nd}$ byte is set, the layer 4 classifier 244 determines whether the size of the layer 4 data is 64 bytes in step 320. If the size of the layer 4 data is 64 bytes, the layer 4 classifier 244 determines that the data is TCP control in step 322 and the process ends in step 310. If the layer 4 classifier 244 determines that the size of the layer 4 data is not 64 bytes, the layer 4 data is classified as TCP data in step 318 and the process ends in step 310.

If the layer 4 classifier 244 determines that the $28^{th}$ byte in the layer 4 header is not set to 0x6 in step 314, the layer 4 classifier 244 determines whether the $28^{th}$ byte is set to 0x11 in step 324. When the $28^{th}$ byte of the layer 4 header is set to 0x11, the data is UDP. Thus, if the $28^{th}$ byte is set to 0x11, the layer 4 classifier 244 determines that the data is UDP in step 326 and the process ends in step 310. If the $28^{th}$ byte is not set to 0x11, the layer 4 classifier 244 determines that the data is non-TCP/UDP data in step 328 and the process ends in step 310.

If the layer 2 classifier 240 determines that the $13^{th}$ and $14^{th}$ bytes in the layer 2 header are not set to 0x8100 (i.e., untagged data) in step 312, the layer 4 classifier 244 determines whether the data is TCP by inspecting the $24^{th}$ byte in the layer 4 header in step 330. More specifically, the layer 4 classifier 244 determines whether the $24^{th}$ byte is set to 0x6. If the $24^{th}$ byte is set to 0x6, the layer 4 classifier 244 determines whether any bits are set in a $48^{th}$ byte of the layer 4 header in step 332. As previously mentioned, the layer 4 classifier 244 may use a logical OR operation on all the bits in the $48^{th}$ byte to determine whether any of the bits are set. If none of the bits are set in the $48^{th}$ byte, the layer 4 classifier 244 classifies the data as TCP data in step 334 and the process ends in step 310. If at least one bit is set in the $48^{th}$ bytes, the layer 4 classifier 244 determines whether the size of the data is 64 bytes in step 336. If the size of the data is not 64 bytes, the layer 4 classifier 244 classifies the data as TCP data in step 334 and the process ends in step 310. However, if the size is 64 bytes, the layer 4 classifier 244 classifies the data as TCP control in step 338 and the process ends in step 310.

If the layer 4 classifier 244 determines that the $24^{th}$ byte in the layer 4 header is not set to 0x6 in step 330, the layer 4 classifier 244 determines whether the $24^{th}$ byte is set to 0x11 in step 340. If the $24^{th}$ byte is set to 0x11, the layer 4 classifier 244 classifies the data as UDP in step 342 and the process ends in step 310. If the $24^{th}$ byte is not set to 0x11, the layer 4 classifier 244 classifies the data as non-TCP/UDP in step 344 and the process ends in step 310.

Figure 7:
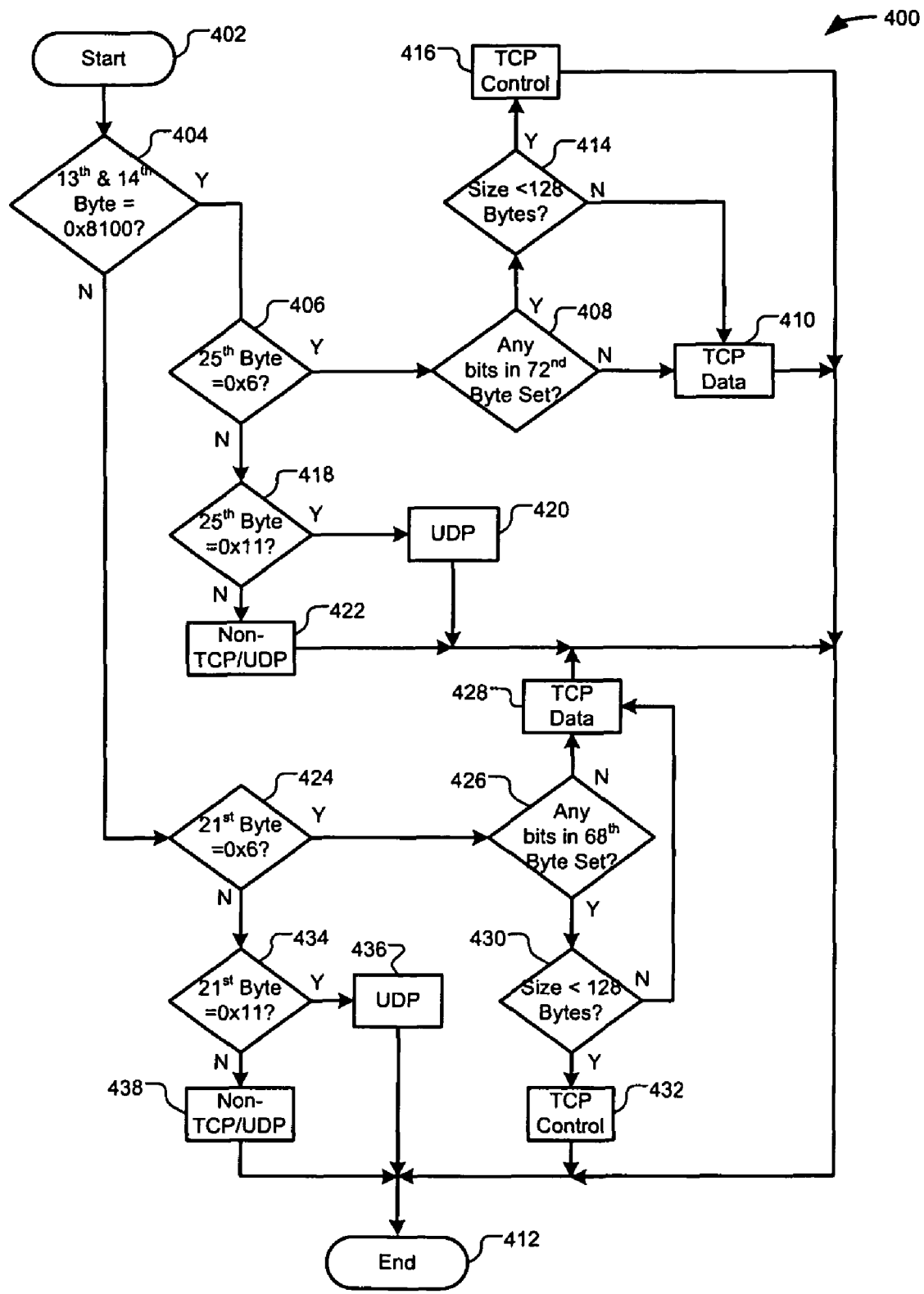
FIG. 7 is a flowchart depicting exemplary steps performed by a rate limitation module for a network that uses Internet Protocol Version 6.

Referring now to FIG. 7, steps to classify IPv6 data in step 308 of FIG. 6 are generally identified at 400. The process begins in step 402 when the layer 2 classifier 240 determines that the data is IPv6. In step 404, the layer 2 classifier 240 determines whether the $13^{th}$ and $14^{th}$ bytes in the layer 2 header are set to 0x8100. If the $13^{th}$ and $14^{th}$ bytes are set, the layer 4 classifier 244 determines whether the $25^{th}$ byte of the layer 4 header is set to 0x6 in step 406. If the $25^{th}$ byte is set to 0x6, the layer 4 classifier 244 determines whether any bits in the $72^{nd}$ byte of the layer 4 header are set in step 408. As previously mentioned, the layer 4 classifier 244 may use a logical OR operation on all the bits in the $72^{nd}$ byte to determine whether any of the bits are set. If none of the bits are set, the layer 4 classifier 244 classifies the data as TCP data in step 410 and the process ends in step 412. If at least one bit is set in the $72^{nd}$ byte, the layer 4 classifier 244 determines whether the size of the layer 4 header is less than 128 bytes in step 414. If the size of the layer 4 header is greater than 128 bytes, the layer 4 classifier 244 classifies the data as TCP data in step 410 and the process ends in step 412. If the size of the layer 4 header is less than 128 bytes, the layer 4 classifier 244 classifies the data as TCP control in step 416 and the process ends in step 412.

If the layer 4 classifier 244 determines that the $25^{th}$ byte in the layer 4 header is not set to 0x6 in step 406, the layer 4 classifier 244 determines whether the $25^{th}$ byte is set to 0x11 in step 418. If the $25^{th}$ byte is set to 0x11, the layer 4 classifier 244 classifies the data as UDP in step 420 and the process ends in step 412. If the $25^{th}$ byte is not set to 0x11, the layer 4 classifier 244 classifies the data as non-TCP/UDP data in step 422 and the process ends in step 412.

If the layer 2 classifier 240 determines that the $13^{th}$ and $14^{th}$ bytes are not set to 0x8100 in step 404, the layer 4 classifier 244 determines whether the $21^{st}$ byte in the layer 4 header is set to 0x6 in step 424. If the $21^{st}$ byte is set to 0x6, the layer 4 classifier 244 determines whether any bits in the $68^{th}$ byte of the layer 4 header are set in step 426. As previously mentioned, the layer 4 classifier 244 may use a logical OR operation on all the bits in the $68^{th}$ byte to determine whether any of the bits are set. If none of the bits are set in the $68^{th}$ byte, the layer 4 classifier 244 classifies that data as TCP data in step 428 and the process ends in step 412. If at least one bit in the $68^{th}$ byte is set, the layer 4 classifier 244 determines whether the size of the layer 4 header is less than 128 bytes in step 430. If the size is greater than 128 bytes, the layer 4 classifier 244 classifies the data as TCP data in step 428 and the process ends in step 412. If the layer 4 header size is less than 128 bytes, the layer 4 classifier 244 classifies the data as TCP control in step 432 and the process ends in step 412.

If the layer 4 classifier 244 determines that the $21^{st}$ byte in the layer 4 header is not set to 0x6 in step 424, the layer 4 classifier 244 determines whether the $21^{st}$ byte is set to 0x11 in step 434. If the $21^{st}$ byte is set to 0x11, the layer 4 classifier 244 classifies the data as UDP in step 436 and the process ends in step 412. If the layer 4 classifier 244 determines that the $21^{st}$ byte is not set to 0x11, the layer 4 classifier 244 classifies the data as non-TCP/UDP in step 438 and the process ends in step 412.

Figure 8:
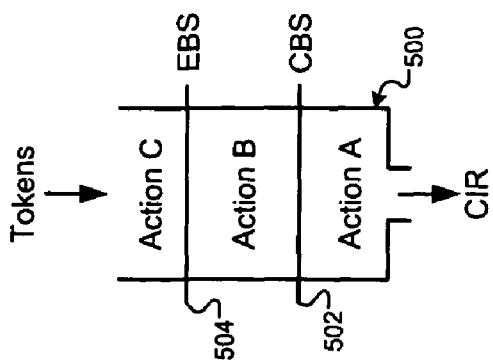
FIG. 8 is a graphical depiction of a leaky bucket traffic shaping algorithm.

The rate limit controller 228 may employ a leaky bucket traffic shaping algorithm, depicted graphically in FIG. 8. A bucket 500 receives tokens that correspond to arriving packets. The number of tokens may be proportional to the size of the packet in bytes, or may be a fixed value independent of size. Tokens flow out of the bucket 500 at a certain rate, referred to as the Committed Information Rate (CIR). If tokens arrive at a faster rate than the CIR, the bucket will begin to fill.

Until the tokens in the bucket 500 reach a first threshold 502, called the Committed Burst Size (CBS), packets are treated according to Action A. Action A usually includes passing (or accepting) the packet, and the corresponding tokens are added to the bucket 500. If the tokens corresponding to a packet will cause the tokens in the bucket 500 to exceed the CBS, a second action, Action B, is performed. Action B may also include simply passing the packet, or it may include dropping the packet.

If Action B includes passing the packet, the packet may be marked, or colored, to indicate that it violated a threshold. The color state may identify the packet as more preferable to drop when the queue controller (or other downstream packet handling device) experiences congestion and chooses to drop a packet. The color state may also cause the packet to receive low priority handling in the queue controller.

Action B may also include instructing the corresponding ingress port to assert flow control. Asserting flow control may include sending a PAUSE frame (defined in IEEE 802.3xy, which is incorporated herein in its entirety) for a full duplex connection, or applying backpressure for a half duplex connection. This instructs the upstream device to stop transmitting packets to the switching device 220. Action B may include asserting flow control while still passing the packet.

This action should only be used when the upstream device is well-behaved; otherwise the upstream device might ignore flow control, causing the rate limit controller to keep passing violating packets.

Once flow control is asserted, the rate limit controller will determine when to de-assert flow control. This could occur after a fixed time period, or when the level of tokens in the bucket 500 falls to a certain point. This point may be when the bucket is empty or when the tokens in the bucket 500 fall below the CBS threshold.

If the tokens corresponding to a packet will cause the bucket 500 to exceed a second threshold 504, called the Excess Burst Size (EBS), Action C is performed on the packets. Any of the actions possible for Action B are also suitable for Action C. If Action C includes flow control, the point at which flow control is de-asserted might be when the tokens in the bucket 500 fall below EBS–CBS.

The leaky bucket algorithm restricts an incoming traffic flow to a certain average rate (the CIR), and offers the ability to incrementally deal with bursts of traffic arriving at speeds in excess of the CIR. The rate limit controller 228 may alternately use a token bucket traffic shaping algorithm, which adds tokens to a bucket at a certain rate up to a specified limit, and arriving packets can use as many tokens as are present in the bucket. The token bucket thus allows for larger bursts of traffic, while enforcing an average traffic rate.

Some leaky bucket algorithms use loose thresholds, whereby a packet may be accepted even if the corresponding tokens will exceed the threshold. The algorithm will then wait until the bucket falls below the threshold before accepting any more packets. This allows larger packets (such as streaming multimedia, and especially video) to be accepted, even though their large size may exceed the bucket's threshold. A strict threshold requires the packet to be small enough that the corresponding tokens will not exceed the threshold. A strict threshold therefore tends to accept smaller packets when operating near the threshold while rejecting larger ones. This is advantageous since TCP packets are small and dropping a TCP control packet with an ACK flag set forces retransmission of the original data packet.

Figure 9:
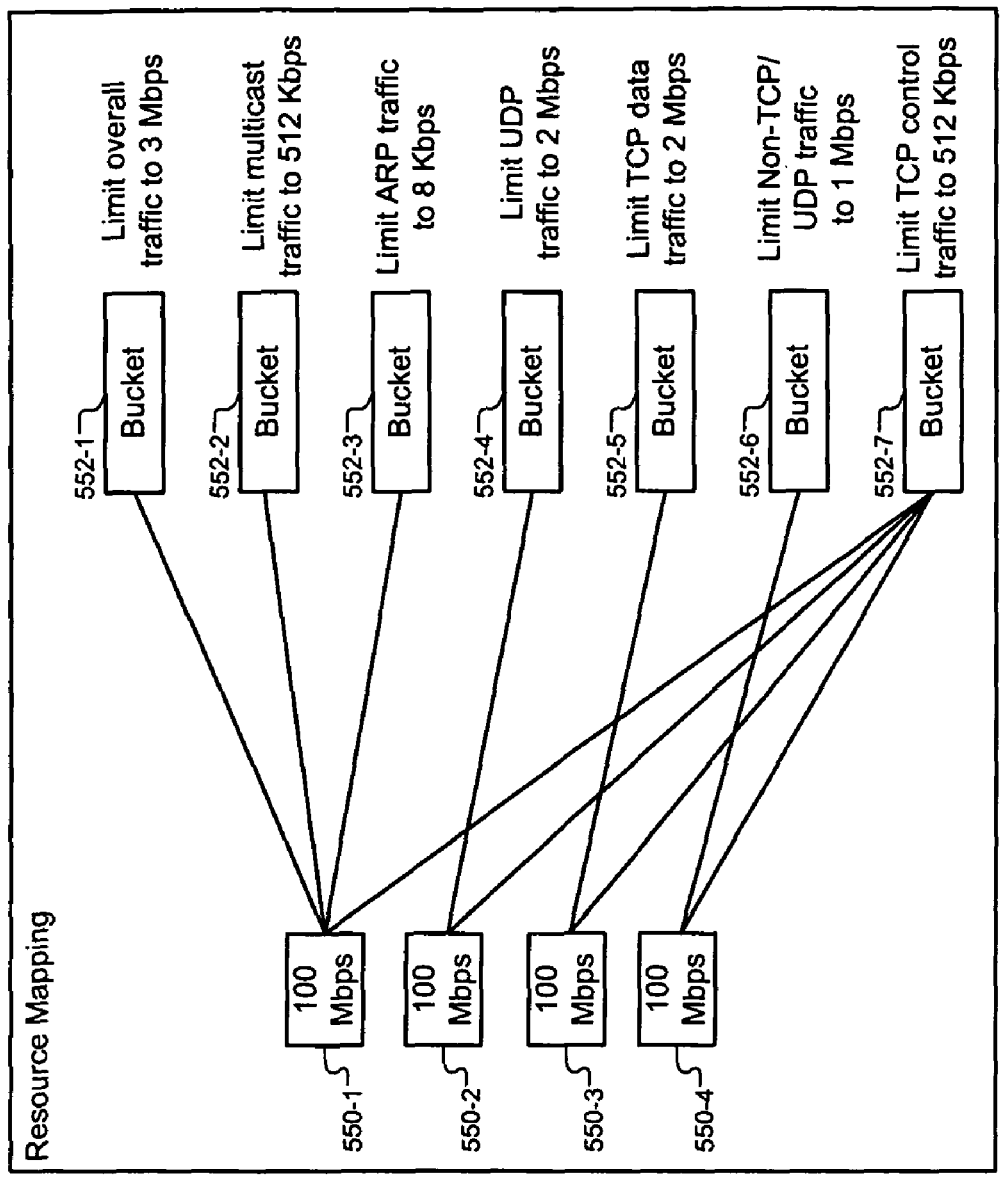
FIG. 9 is a graphical depiction of an exemplary assignment of buckets to ports.

The buckets described in FIG. 8 can be assigned to one or more ports to limit various traffic rates of interest. FIG. 9 is a graphical depiction of an exemplary assignment of buckets to ports. Many other exemplary configurations are possible, and often there will be a greater number of buckets than ports. Six ports with twelve buckets is another exemplary implementation. Switches with multiples of six ports can be formed by replicating the six-port implementation, with each group of six ports sharing a group of twelve buckets.

In the example of FIG. 9, a first port 550-1 is assigned to first, second, and third buckets 552-1, 552-2, and 552-3. Second, third, and fourth ports 550-2, 550-3, and 550-4 are assigned to fourth, fifth, and sixth buckets 552-4, 552-5, and 552-6, respectively. The first, second, third, and fourth ports 550-1, 550-2, 550-3, and 550-4 are also assigned to a seventh bucket 552-7. The first bucket 552-1 limits the overall traffic rate from the first port 550-1 to 3 Mbps. The second bucket 552-2 limits the rate of multicast traffic from the first port 550-1 to 512 Kbps. The third bucket 552-3 limits ARP (Address Resolution Protocol) traffic from the first port to 8 Kbps. The fourth bucket 552-4 limits UDP traffic from the second port 550-2 to 2 Mbps. The fifth bucket 552-5 limits TCP data packets from the third port 550-3 to 2 Mbps. The sixth bucket 552-6 limits non-TCP/UDP traffic from the third port 550-3 to 2 Mbps. The seventh bucket 552-7 limits TCP control traffic originating from any of the four ports 552 to an aggregate rate of 512 Kbps.

By link aggregating the four ports 552 (as defined in IEEE 802.3ad, which is incorporated herein by reference in its entirety), they may be assigned to a single bucket that limits overall aggregate traffic. Link aggregation is a method of using multiple links in parallel between two devices to increase aggregate bandwidth. Assigning two (or more) link aggregated ports to the same bucket allows this aggregate bandwidth to be controlled. The four link aggregated ports could all also be assigned to various buckets that limit such traffic as ARP traffic, multicast traffic, broadcast traffic, unknown address traffic, TCP control traffic, TCP data traffic, UDP traffic, and BPDU (Bridge Protocol Data Unit) traffic. Broader categories may be defined, such as management traffic, which may include BPDU and ICMP (Internet Control Message Protocol) traffic.

An aggregate broadcast traffic limit is useful in limiting the growth of a broadcast storm, where a mis-configured switching device causes broadcast packets to be endlessly replicated. An ARP traffic limit is useful in restricting ARP message floods used in a Denial of Service (DoS) attack. A TCP control traffic limit is useful in restricting TCP control traffic used in a DoS attack such as a SYN flood attack. Ports which are not trusted, or which have previously generated malicious traffic, can receive lower limits or be grouped together into a single restricted-speed bucket.

Switching devices generally maintain address tables (such as a MAC address table) to map network addresses to switch ports. If a packet is directed to a network address that does not yet have a mapping (referred to as unknown traffic), the switching device usually floods the packet out of all of the connected ports except the incoming port. This behavior may be exploited in a DoS attack, thus limiting unknown unicast or unknown multicast packets may be a desired configuration.

Referring now to FIG. 10, a functional block diagram of an exemplary implementation of the rate limit controller 228 is depicted. A resource updater module 600 receives traffic information from traffic limitation modules 226 (as depicted in FIG. 4), and relays action directions to the traffic limitation modules 226. The resource update module 600 may also receive information from ingress ports 222 and/or the queue controller 230. This information may be useful in altering which packets are counted. For instance, if a packet is discarded (or filtered) by an ingress module, its tokens might still be added to the corresponding bucket (i.e., counted against the user, even though it is discarded). The counterpart to this practice is that if the queue controller 230 drops a packet because of congestion, its tokens may be ignored by the corresponding buckets, so that packets dropped due to congestion are not "charged" to the user.

The resource updater module 600 communicates with a port settings module 602, a port resource map module 604, a resource settings module 606, a shared resources module 608, and a clock 610. The resource updater module 600 stores settings for each port (described in more detail with respect to FIG. 11) in the port settings module 602. The resource updater module 600 stores settings for resources (described in more detail with respect to FIG. 12) in the resource settings module 606. Some settings are independent for each bucket, while others are common.

The shared resources module 606 contains the shared resources, such as buckets as described in FIG. 8. The resource map module 604 specifies which shared resources from the shared resources module 608 correspond to each port (described in more detail with respect to FIG. 11). The resource map module 604 may be stored in the same memory as resource settings 606. Port settings 602 and resource settings 606 may be stored in the same memory. The resource updater module 600 uses information from the clock 610 (which may alternately be generated elsewhere) to remove tokens from the buckets at intervals corresponding to their respective CIRs (Committed Information Rates).

Referring now to FIG. 11, a table of exemplary port settings is depicted. These settings are set independently for each port. Three non-rate-limit settings are included. Each one of these enables rate-limiting exemption for certain packets. The first, VID_NRL, allows packets to be exempted from rate-limiting for certain VLAN IDs. The second, SA_NRL, allows packets to be exempted from rate-limiting based upon their source address, and DA_NRL allows packets to be exempted from rate-limiting based upon their destination address.

The number of bits used for any setting may vary, but an exemplary number is given for each setting. Settings may also be multiplexed or stored in any other arrangement. The non-rate-limit enable settings are binary settings, and use one bit each. When VID_NRL is enabled, the traffic limitation module 226 looks to a VLAN database to determine if a packet with a particular VLAN ID should be exempted. Likewise, when SA_NRL or DA_NRL is enabled, the traffic limitation module 226 looks to a switch table to determine if a packet with a certain source address or destination address should be exempted.

A flow control mode setting (FC_Mode, 1 bit in size) specifies when flow control should be de-asserted. A first state such as 0 specifies that flow control should be de-asserted when the bucket(s) that instructed flow control to be asserted become empty. A second state such as 1 specifies that flow control should be de-asserted when the bucket(s) which instructed flow control to be asserted have few enough tokens to accept a packet the size of CBS (committed burst size); in other words, when the number of tokens is less than or equal to EBS (excess burst size)–CBS.

A Rate_Resource setting stores the resource mapping for the bucket. In this example, 12 resources are present, thus Rate_Resource is a 12-bit bit field. Each bit that is set in Rate_Resource indicates that the corresponding resource is assigned to this port. As a bit field, zero, one, or multiple bits may be set within Rate_Resource. If no bits are set, the port is not assigned any resources, and thus is not rate limited.

Referring now to FIG. 12, a table of exemplary resource settings is depicted. These settings are stored individually for each resource. For simplicity, the resource discussed in this example will be a leaky bucket. CBS_Limit (24 bits) is the number of tokens that define the Committed Burst Size (CBS) limit of the bucket. EBS_Limit (24 bits) is the number of tokens that define the Extended Burst Size (EBS) limit of the bucket.

EBS_Limit_Action (1 bit) specifies what action should be taken when the tokens corresponding to a packet would exceed the EBS_Limit. In one implementation, a first state such as 0 corresponds to discarding the packet, and a second state such as 1 corresponds to passing the packet while asserting flow control. If the upstream device of a port has a trusted flow control mechanism, EBS_Limit_Action for each of the buckets assigned to that port should be set to the second state. A parallel field, CBS_Limit_Action, could be defined, but in this implementation, when tokens corresponding to a packet would exceed the CBS_Limit, flow control is asserted while passing the packet.

Account_Q_Congest (1 bit) determines whether packets discarded because of queue congestion should contribute tokens to the bucket. An analogous setting, Account_Filtered (1 bit), determines whether packets filtered within the switching device 220 (such as at the ingress port 222) should contribute tokens to the bucket. If both settings are set to false, a user's packets are not counted against their rate quota if they are dropped because of errors within the packet, queue congestion, etc.

Bucket_Rate_Factor (16 bits) indicates how many tokens should be decremented from the bucket for each interval of time. Bucket_Rate_Factor is thus directly proportional to the CIR (Committed Information Rate). A Bucket_Rate_Type (1 bit) setting specifies how to calculate tokens from packet contents. In one implementation, a first state such as 0 corresponds to tokens only being counted for certain packet types. A second state such as 1 corresponds to certain bytes of every packet being counted as tokens.

A Bucket_Type_Mask (11 bits) setting determines which packet types (as identified by fields in the packet header or other indicators) generate tokens when Bucket_Rate_Type is in the first state. Bucket_Type_Mask is a bit field, allowing each type to be individually selected. Packet types in this implementation include multicast, ARP, Pause, BPDU (Bridge Protocol Data Units), TCP control, TCP data, UDP, and Non-TCP/UDP. Many other packet types and/or groupings are possible. The Bucket_Type_Mask setting includes provision for four more, as eleven bits are available and only seven types are defined.

A Bits_To_Count (3 bits) setting determines which bits of a packet generate tokens when Bucket_Rate_Type is in the second state. Bits_To_Count is a bit field, and each set bit excludes more packet bits from the calculation. With Bits_To_ Count cleared, all packet bits are counted. This number may be determined from a layer 2 size reported by the ingress module 222 plus preamble, SFD (Start Frame Delimiter), and IFG (InterFrame Gap). For simplicity, the preamble can be assumed to be a constant 7 bytes, the SFD 1 byte, and the IFG 12 bytes. Setting a first bit excludes layer 1 bits from the calculation. Setting a second bit excludes layer 2 bits from the calculation and setting a third bit excludes layer 3 bits from the calculation.

Bucket_Increment (12 bits) specifies how many tokens are added to the bucket for each unit (byte) of qualifying port traffic. Bucket_Token_Count (24 bits) stores the number of tokens currently within the bucket. Last_Updated_Time (8 bits) stores the interval number when the Bucket_Token_Count was last updated. Bytes_Dropped (16 bits) indicates the number of bytes of packets dropped corresponding to the bucket. Bytes_Received (16 bits) indicates the number of bytes of packets received by ports corresponding to the bucket. The Bytes_Dropped and Bytes_Received counters do not have a maximum value and so wrap around (the adder carry bit is discarded).

Two settings not depicted in FIG. 12, because they are common to all buckets, are Current_Time_Update_Interval (3 bits) and Current_Time (8 bits). Current_Time_Update_Interval functions essentially as a clock divisor. The rate limitation module 246 increments Current_Time every Current_Time_Update_Interval number of clock ticks. The values of Current_Time_Update_Interval may be powers of 2, or may be less exponential (such as 2, 4, 8, 16, 24, 36, 48, and 72). As an example, with a clock rate of 50 MHz (20 ns period) and a Current_Time_Update_Interval of 4, current time is incremented every 80 ns.

Suggestions for values to use as the settings of FIG. 12 may include the following. Bucket_Rate_Factor is expressed in tokens per interval. To set the Bucket_Rate_Factor based upon CIR, the CIR needs to be converted: Bucket_Rate_Factor (tokens/interval)=Bucket_Increment (tokens/byte)*1/8 (bytes/bit)*CIR (bits/s)*clock speed (s/clock tick)*Current_Time_Update_Interval (clock ticks/interval). EBS_Limit can be set as follows: EBS_Limit (tokens)=(Expected burst rate (bits/s)−CIR (bits/s))*Expected burst duration (s)*1/8 (bytes/bit)*Bucket_Increment (tokens/byte). CBS_Limit can be determined similarly.

Bucket_Increment should be inversely related to CIR so that their product is not disproportionately large for the size of Bucket_Token_Count (24 bits in this case). CBS_Limit should be greater than Bucket_Increment times the MTU (Maximum Transmission Unit) of any of the associated ports. This will guarantee that the bucket, when empty, will be able to accept MTU-sized packets without violating the CBS threshold.

A larger Current_Time_Update_Interval allows for a larger, and thus more granular, Bucket_Rate_Factor. For example, if Current_Time_Update_Interval is 1 and Bucket_Rate_Factor is 1, Bucket_Rate_Factor cannot be changed without doubling its value. Increasing Current_Time_Update_Interval to 8 allows Bucket_Rate_Factor to vary from 8 to 9, only a 12% increase. Increasing Current_Time_Update_Interval must be done carefully, however so as not to increase Bucket_Rate_Factor beyond its storage size (16 bits in this case).

Figure 13:
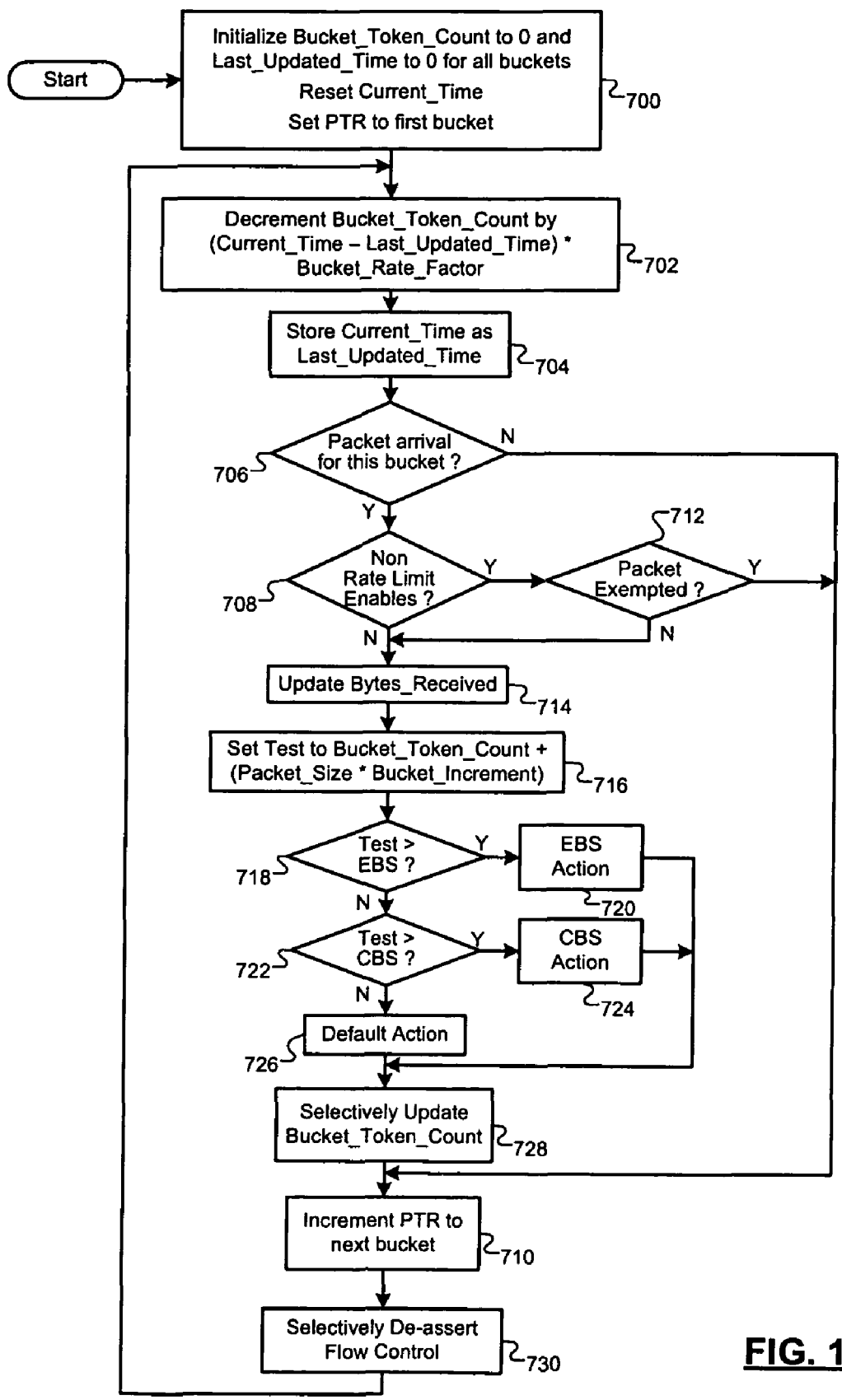
FIG. 13 is a flow chart depicting exemplary steps performed by the rate limit controller.

Referring now to FIG. 13, a flow chart of exemplary steps performed by the rate limit controller 228 is presented. Control starts at step 700 where Bucket_Token_Count is initialized to zero and Last_Updated_Time is initialized to zero for each bucket. Current_Time is reset, and a pointer variable PTR is set to the first bucket. Control transfers to step 702 where Bucket_Token_Count is decremented by (Current_Time−Last_Updated_Time)*Bucket_Rate_Factor. As Current_Time wraps around, and thus may be less than Last_Updated_Time, it is assumed that the binary subtraction logic used will account for this effect.

Control transfers to step 704 where Current_Time is stored into Last_Updated_Time for the bucket referenced by PTR. Control transfers to step 708 where, if there is a packet arrival corresponding to this bucket, control transfers to step 708; otherwise control transfers to step 710. In step 708, if any non-rate-limit enables (VID_NRL, SA_NRL, DA_NRL) are set, control transfers to step 712; otherwise control transfers to step 714. In step 712, if the current packet's parameter (VID, SA, or DA) entry in the VLAN or switching table indicates the packet should be exempted, control transfers to step 710; otherwise control transfers to step 714.

In step 714 Bytes_Received for the bucket referenced by PTR is incremented by the number of bytes in the packet. Control continues in step 716 where a variable Test is set to Bucket_Token_Count+(Packet_Size*Bucket_Increment). Packet_Size is based upon Bucket_Rate_Type and Bucket_Type_Mask or Bits_To_Count, as discussed with respect to FIG. 12.

Control continues in step 718 where, if Test is greater than EBS_Limit, control transfers to step 720; otherwise control transfers to step 722. In step 722, if Test is greater than CBS_Limit, control transfers to step 724; otherwise control transfers to step 726. In step 720, the rate limit controller 228 communicates the action dictated by EBS_Limit Action to the corresponding rate limitation module 246 and control continues with step 728. In step 724, the rate limit controller 228 communicates accepting the packet and asserting flow control (or the action dictated by CBS_Limit_Action, if it were defined) to the corresponding rate limit module, and control continues with step 728.

In step 726, the rate limit controller 228 communicates the default action to the corresponding rate limitation module 246 and control continues with step 728. The default action usually includes passing the packet. In step 728 control selectively updates Bucket_Token_Count, as described below with respect to FIG. 14. Control continues with step 710, where PTR is incremented modulo the number of buckets. In other words, if PTR pointed to the last bucket, it will wrap around to the first bucket. Control continues with step 730 where flow control is selectively de-asserted. Flow control is de-asserted if the bucket has instructed a port to assert flow control and the bucket's level has fallen below the level specified by FC_Mode. Control then returns to step 702, where the process is repeated.

The steps of FIG. 13 may be repeated in a loop for each of the ports in the switching device 220. In this manner, a packet arriving at the first port is analyzed by all buckets as detailed in FIG. 13, then a packet arriving at the second port is analyzed by all buckets, etc. For a packet arriving at a certain port, if any of the buckets specify that flow control should be asserted, the port should assert flow control. Likewise, if any of the buckets specify that the packet should be dropped, the rate limiter module should drop the packet.

Figure 14:
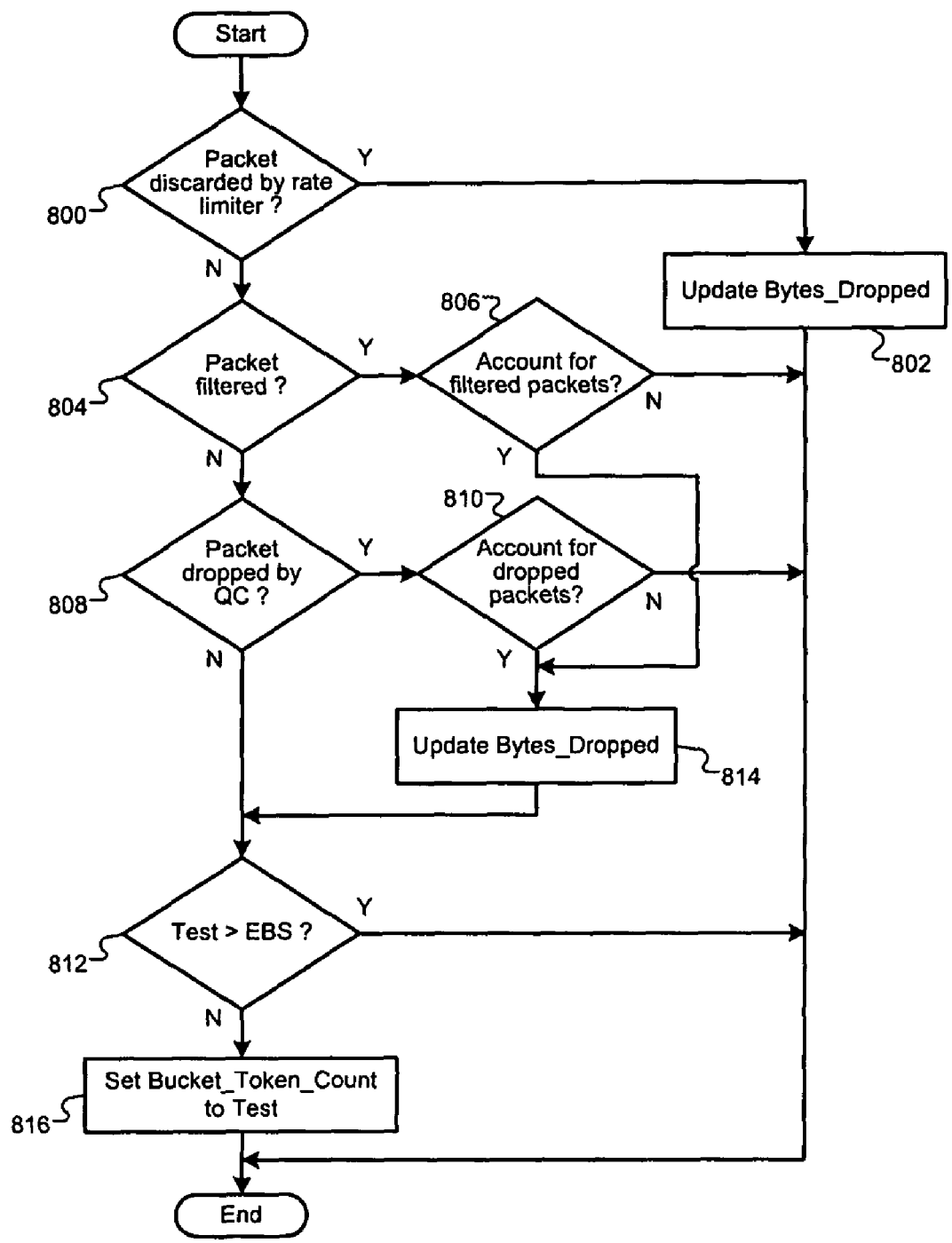
FIG. 14 is a flow chart depicting exemplary steps performed to update Bucket_Token_Count.

Referring now to FIG. 14, a flow chart of exemplary steps performed by the rate limit controller 228 to update Bucket_Token_Count is presented. Control starts at step 800 where, if the current action includes discarding the packet, control transfers to step 802; otherwise control transfers to step 804. In step 802, Bytes_Dropped is incremented by the number of bytes in the packet, and control ends. In step 804, if the packet is filtered (such as by the ingress module), control transfers to step 806; otherwise control transfers to step 808. In step 806, if filtered packets are accounted for (Account_Filtered is 1), control transfers to step 814; otherwise control ends.

In step 808, if the packet is dropped by the queue controller 230, control transfers to step 810; otherwise control transfers to step 812. In step 810, if dropped packets are accounted for (Account_Q_Congest is 1), control transfers to step 814; otherwise control ends. In step 814 Bytes_Dropped is incremented by the number of bytes in the packet, and control transfers to step 812. In step 812, if Test is greater than EBS_Limit, control ends; otherwise control transfers to step 816. In step 816, Bucket_Token_Count is updated to the value of Test, and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A switching device, comprising:
a parsing module configured to receive packets and separate layer four packets from said packets;
a classification module configured to classify said layer four packets into control packets and data packets;
a bandwidth tracking module in communication with said classification module, said bandwidth tracking module having a fullness level that indicates a fill level of a bucket; and
a rate limitation module configured to selectively perform an action on at least one of said control packets and said data packets based on said classification of said layer four packets and said fullness level,
wherein said action includes transmitting a pause signal to assert flow control,
wherein said classification module is configured to identify transmission control protocol (TCP) control packets, TCP data packets, user datagram protocol (UDP) packets, non-TCP packets, and non-UDP packets, wherein when classifying said layer four packets, said classification module is configured to determine a packet type of said layer four packets to be one of TCP control, TCP data, UDP, non-TCP, and non-UDP, and wherein said rate limitation module is configured to selectively perform said action on said at least one of said control packets and said data packets based on said packet type.

2. The switching device of claim 1, wherein said control packets are transmission control protocol (TCP) control packets.

3. The switching device of claim 1, wherein said data packets are transmission control protocol (TCP) data packets.

4. The switching device of claim 1, wherein said data packets are user datagram protocol (UDP) data packets.

5. The switching device of claim 1, wherein said data packets are non-TCP/UDP data packets.

6. The switching device of claim 1, wherein said parsing module is configured to separate layer two packets from said received packets.

7. The switching device of claim 1, wherein said classification module is configured to inspect a header in said layer four packets to classify said control packets and said data packets.

8. The switching device of claim 6, wherein said classification module is configured to inspect a header in said layer two packets to classify said control packets and said data packets.

9. The switching device of claim 1, wherein said rate limitation module is configured to decrease said fullness level at a predetermined rate and selectively increase said fullness level.

10. The switching device of claim 1, wherein said at least one of said control packets and said data packets are selectively exempted from said action.

11. The switching device of claim 1, wherein:
said at least one of said control packets and said data packets are selectively exempted from said action based upon a property of said received packets; and
said property includes at least one of VLAN ID, source address, and destination address.

12. A switching device, comprising:
a parsing module configured to receive packets and separate said packets into parsed packets;
a classification module configured to classify said parsed packets into transmission control protocol (TCP) control packets and data packets;
a bandwidth tracking module in communication with said classification module, wherein said bandwidth tracking module has a fullness level that indicates a fill level of a bucket; and
a rate limitation module configured to selectively perform an action on at least one of said TCP control packets and said data packets based on said classification of said parsed packets and said fullness level,
wherein said action includes transmitting a pause signal to assert flow control, and
wherein said classification module is configured to determine a packet type of said parsed packets based on a classification of said received packets as one of Internet protocol version 4 (IPv4) data, Internet protocol version 6 (IPv6) data, tagged data and untagged data.

13. The switching device of claim 12, wherein said data packets are TCP data packets.

14. The switching device of claim 12, wherein said data packets are user datagram protocol (UDP) data packets.

15. The switching device of claim 12, wherein said data packets are non-TCP/UDP data packets.

16. The switching device of claim 12, said classification module is configured to inspect a header of said parsed packets to classify said TCP control packets and said data packets.

17. The switching device of claim 16, wherein said header is a layer four header.

18. The switching device of claim 16, wherein said header is a layer two header.

19. The switching device of claim 12, wherein said rate limitation module is configured to decrease said fullness level at a predetermined rate and selectively increase said fullness level.

20. The switching device of claim 12, wherein said at least one of said TCP control packets and said data packets are selectively exempted from said action.

21. The switching device of claim 12, wherein:
said at least one of said TCP control packets and said data packets are selectively exempted from said action based on a property of said packets; and
said property includes at least one of VLAN ID, source address, and destination address.

22. A rate limiting method for a switching device, comprising:
receiving packets via a parsing module;
separating layer four packets from said packets;
classifying said layer four packets into control packets and data packets;
selectively performing an action on at least one of said control packets and said data packets based on said classification of said layer four packets and a fullness level, wherein the fullness level indicates a fill level of a bucket, and
wherein said action includes transmitting a pause signal to assert flow control; and
determining a packet type of said layer four packets based on a layer 2 classification of said packets received by said parsing module.

23. The method of claim 22, wherein said control packets are transmission control protocol (TCP) packets.

24. The method of claim 22, wherein said data packets are transmission control protocol (TCP) data packets.

25. The method of claim 22, wherein said data packets are user datagram protocol (UDP) packets.

26. The method of claim 22, wherein said data packets are non-TCP/UDP data packets.

27. The method of claim 22, further comprising separating layer two packets from said data packets.

28. The method of claim 22, further comprising inspecting a header in said layer four packets to classify said at least one of said control packets and said data packets.

29. The method of claim 27, further comprising inspecting a header in said layer two packets to classify said at least one of said control packets and said data packets.

30. The method of claim 22, further comprising decreasing said fullness level at a predetermined rate and selectively increasing said fullness level.

31. The method of claim 22, wherein at least one of said control packets and said data packets are selectivity exempted from said action.

32. The method of claim 22, further comprising selectively exempting said at least one of said control packets and said data packets from said action based upon a property of said packets,
wherein said property includes at least one of VLAN ID, source address, and destination address.

33. A rate limiting method for a switching device, comprising:
receiving packets via a parsing module;
separating said packets into parsed packets;
classifying said parsed packets into transmission control protocol (TCP) control packets and data packets;
selectively performing an action on at least one of said TCP control packets and said data packets based on said classification of said parsed packets and a fullness level, wherein said action includes transmitting a pause signal to assert flow control, and wherein said fullness level indicates a fill level of a bucket; and
limiting a transfer rate of said packets received by said parsing module based on a respective layer of said received packets.

34. The method of claim 33, wherein said data packets are TCP data packets.

35. The method of claim 33, wherein said data packets are user datagram protocol (UDP) packets.

36. The method of claim 33, wherein said data packets are non-TCP/UDP data packets.

37. The method of claim 33, further comprising inspecting a header of said parsed packets to classify said at least one of said TCP control packets and said data packets.

38. The method of claim 37, wherein said header is a layer four header.

39. The method of claim 37, wherein said header is a layer two header.

40. The method of claim 33, further comprising decreasing said fullness level at a predetermined rate and selectively increasing said fullness level.

41. The method of claim 33, further comprising selectively exempting said at least one of said TCP control packets and said data packets from said action.

42. The method of claim 33, wherein:
said selectively exempting said at least one of said TCP control packets and said data packets is based on a property of said packets; and
said property includes at least one of VLAN ID, source address, and destination address.

43. The switching device of claim 1, wherein:
said classification module is configured to identify said received packets as transmission control protocol (TCP) packets and as non-TCP packets; and
said rate limiting module is configured to limit a transfer rate of said TCP packets differently than said transfer rate of said non-TCP packets.

44. The switching device of claim 1, wherein said classification module is configured to determine a packet type of said layer four packets based on a classification of said received packets as one of Internet protocol version 4 (IPv4) data and Internet protocol version 6 (IPv6) data.

45. The switching device of claim 1, wherein said classification module is configured to determine a packet type of said layer four packets based on a classification of at least one of said received packets as one of tagged data and untagged data.

46. The switching device of claim 1, wherein said classification module is configured to determine a packet type of said layer four packets based on a layer 2 classification of said received packets.

47. The switching device of claim 1, wherein said rate limiting module is configured to limit a transfer rate of said received packets based on a respective layer of said received packets.

48. The switching device of claim 47, wherein:
said rate limiting module is configured to receive a first set of packets corresponding to a first layer and a second set of packets corresponding to a second layer; and
said rate limiting module is configured to limit a transfer rate of said first set of packets differently than a transfer rate of said second set of packets based on layer of said first set of packets and said second set of packets.

49. A rate limiting method for a switching device, comprising:
receiving packets;
separating layer four packets from said packets;
classifying said layer four packets into control packets and data packets;
selectively performing an action on at least one of said control packets and said data packets based on said classification of said layer four packets and a fullness level, wherein said action includes transmitting a pause signal to assert flow control;
initializing a bucket token count;
setting a pointer to a first bucket;
decrementing said bucket token count by a difference in time multiplied by a bucket rate factor;
incrementing a number of bytes received by said first bucket by a number of bytes in a received packet;
setting a test variable to a sum of said bucket token count and a size of said received packet multiplied by a bucket increment value;
updating said bucket token count;
incrementing said pointer to a second bucket subsequent to said updating; and
deasserting said flow control subsequent to said incrementing.

50. The rate limiting method of claim 49, wherein updating said bucket token count comprises setting said bucket token count to said test variable when:
said received packet is not to be discarded;
said received packet is filtered;
said received packet is not dropped; and
said test variable is greater than an excess burst size value.

51. The rate limiting method of claim 49, further comprising determining said bucket rate factor based on said bucket increment value, a committed information rate, a clock speed, and a current time update interval.

52. The rate limiting method of claim 49, wherein:
said bucket token count is updated when said test variable is greater than an excess burst size limit; and
said excess burst size limit is determined based on an expected burst rate, a committed information rate, said bucket increment value, and an expected burst duration.

* * * * *